W. M. SHEEHAN.
LOCOMOTIVE CRADLE.
APPLICATION FILED APR. 16, 1920.
1,371,579.
Patented Mar. 15, 1921.
3 SHEETS—SHEET 2.
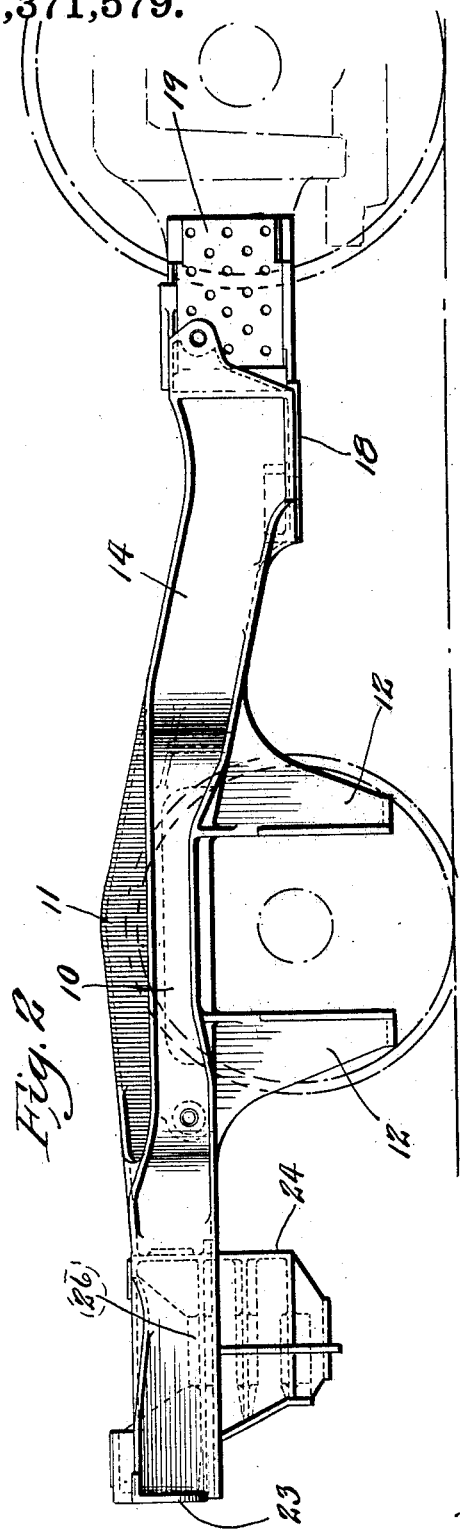
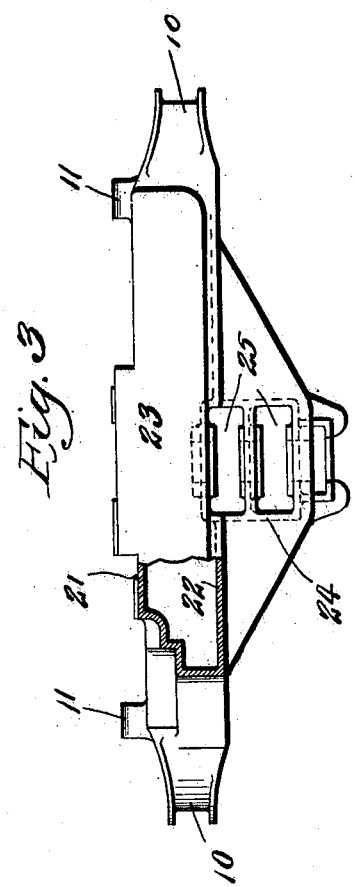
Inventor
William M. Sheehan
By

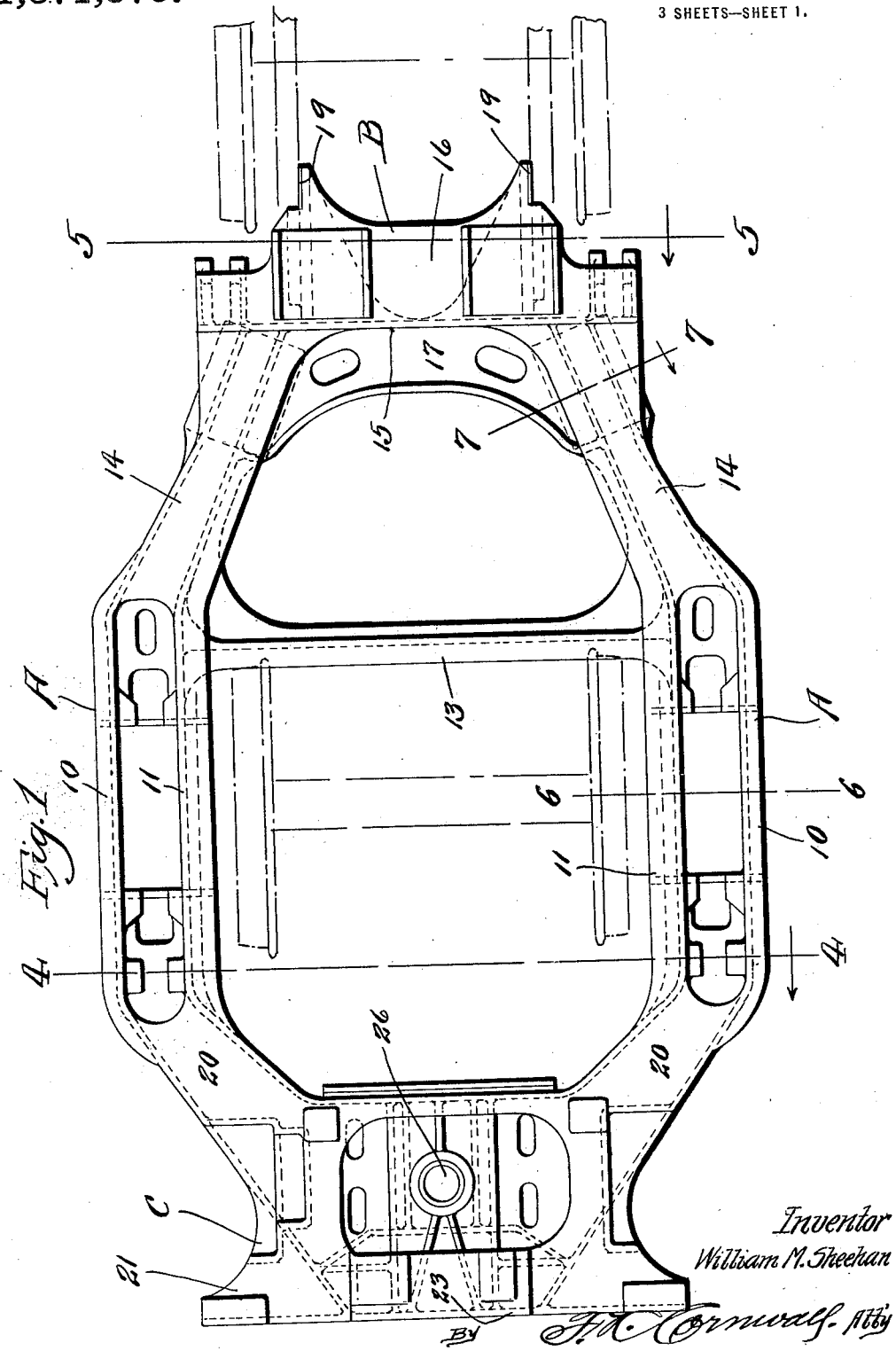

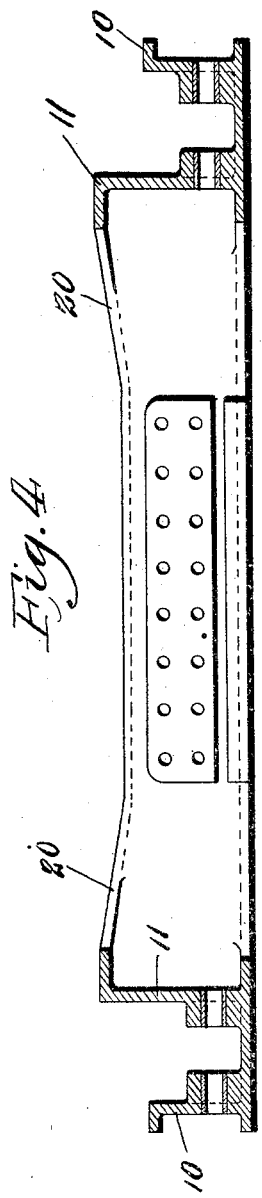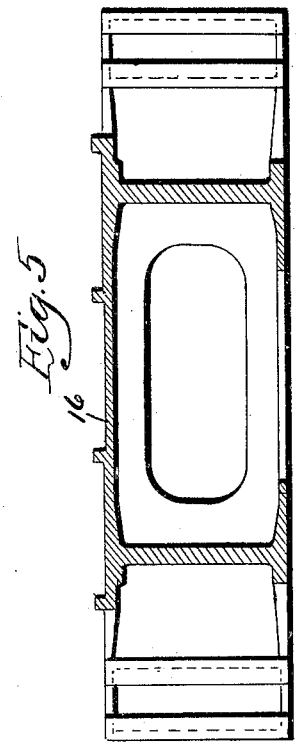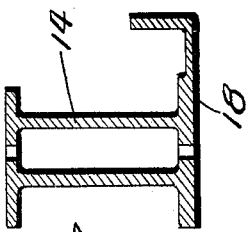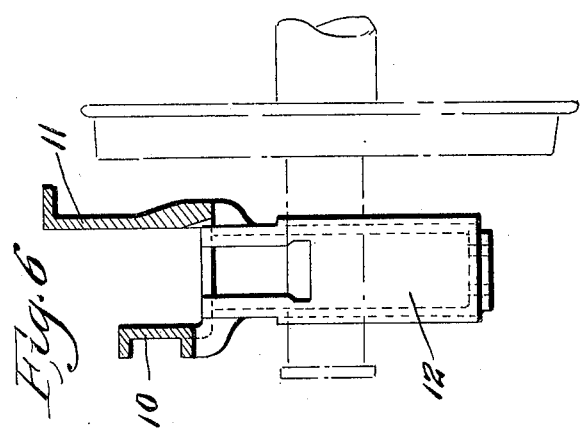

UNITED STATES PATENT OFFICE.

WILLIAM M. SHEEHAN, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE-CRADLE.

1,371,579. Specification of Letters Patent. Patented Mar. 15, 1921.

Application filed April 16, 1920. Serial No. 374,255.

*To all whom it may concern:*

Be it known that I, WILLIAM M. SHEEHAN, a citizen of the United States, residing at St. Louis, Missouri, have invented a certain new and useful Improvement in Locomotive-Cradles, of which the following is a full, clear, and exact description, such as will enable others skilled in the art to which it appertains to make and use the same, reference being had to the accompanying drawings, forming part of this specification.

My invention relates generally to locomotive construction, and more particularly to a rear frame or cradle that is directly connected to the main frame of the locomotive and which coöperates therewith in supporting the locomotive body and parts associated therewith.

The principal object of my invention is to provide a locomotive rear frame or cradle that is formed in a single piece, preferably by casting, and to arrange the main members of the frame so that they practically inclose the trailer truck wheels and frame.

In connection with my invention, it will be understood that to a considerable extent it is the present practice to construct locomotive cradles or rear frames from separately formed members and to rigidly connect said members by means of rivets, bolts, and the like. This construction has certain disadvantages, for instance, the cost of production of the separately formed parts, the time and labor involved in fabrication, and further, for the reason that the strains and vibration developed while the cradle or frame is in service tends to loosen the joints between the assembled parts, thereby materially decreasing the strength and stability of the frame and also destroying the alinement of various brackets and bearings which receive certain parts necessarily associated with and carried by the cradle.

I propose to overcome the objectionable features just mentioned by forming the cradle or rear frame in a single piece, preferably by casting, and forming integral therewith a number of essential parts, for by such construction I am able to produce an exceptionally strong, rigid and substantial frame or cradle which, in service, will resist to a relatively high degree all strains to which it is ordinarily subjected, and which one-piece construction will not be affected by the constant vibration and service shocks which it may receive while in use.

Further, by my improved construction I am able to produce with practically the same amount of material now used in a fabricated structure, a rear frame or cradle which has much greater strength than said fabricated structure, and likewise I am able to produce a cradle having the requisite strength with comparatively less metal and consequently less weight than is required in an assembled structure.

My present invention is an improvement on the locomotive cradle disclosed in Patent No. 1,247,731 issued to my assignee November 27, 1917.

With the foregoing and other objects in view, my invention consists in certain novel features of construction and arrangement of parts, hereinafter more fully described and claimed, and illustrated in the accompanying drawings, in which—

Figure 1 is a top plan view of a locomotive cradle or rear frame of my improved construction.

Fig. 2 is a side elevational view of the cradle.

Fig. 3 is a rear elevational view of the cradle with a portion thereof in vertical section.

Fig. 4 is an enlarged cross section taken approximately on the line 4—4 of Fig. 1.

Fig. 5 is an enlarged cross section taken approximately on the line 5—5 of Fig. 1.

Fig. 6 is an enlarged cross section taken approximately on the line 6—6 of Fig. 1.

Fig. 7 is an enlarged cross section taken approximately on the line 7—7 of Fig. 1.

As illustrated in the drawings, the entire cradle or rear frame is formed in a single piece, preferably by casting, and, generally speaking, said cradle comprises a pair of side members A, a front end member B, and a rear member C. The central portions of the side members A comprise substantially parallel outer rails 10, and inner rails 11, the same being spaced a suitable distance apart in order to accommodate certain members of the equalizing system associated with the locomotive frame, and formed integral with and depending from these rail members 10 and 11 are pedestals 12 that are spaced apart a sufficient distance to receive the journal boxes of the trailer truck that is associated with the rear frame or cradle. These rail members 10 and 11 may be of any desired cross sectional shape, although, as illustrated, I prefer to form said members of channel-shape in cross section with the top and bottom flanges on the rails 10 outwardly presented, and the corresponding flanges on the rails 11 inwardly presented. (See Figs. 4 and 6).

The forward portions of the pairs of rails 10 and 11 forming the central portions of the side members A of the cradle are connected by an integrally formed rail 13, the same being preferably Z-shape in cross section. The front end portions 14 of the side members A are substantially box-shape in cross section and said parts gradually converge toward the medial line of the cradle and their forward ends are connected by the integrally formed front end member B. This front end member in its entirety constitutes a frame brace and it comprises a transversely disposed vertical plate 15, a horizontally disposed top plate 16 that projects forwardly from the upper portion of the transverse plate 15, and a horizontally disposed bottom plate 17 that projects rearwardly from the lower portion of said transverse plate 15. The end portions of the bottom plate 17 or those beneath the forward ends of the converging portions 14 of the side rails have their underfaces 18 finished so as to form bearing surfaces for friction pads that are carried by the trailer truck frame, (not shown).

Formed integral with the frame brace B and depending from the end portions of the top plate 16 and projecting forwardly from the transverse plate 15 are vertically disposed plates 19 that are parallel with each other and substantially parallel with the medial line of the cradle, said plates serving as bearings and points of attachment for the rear portions of the side members of the main frame of the locomotive. (See dotted lines, Figs. 1 and 2).

The rear portions 20 of the side members A of the cradle are substantially box-shape in cross section, and these members converge toward the medial line of the cradle, and their rear ends are connected by the integrally formed structure C. This last mentioned structure includes a horizontally disposed top plate 21, a horizontally disposed bottom plate 22, that is in substantial horizontal alinement with the lower portions of the members 20, and a transversely disposed vertical plate 23, the latter performing the functions of a chafing plate.

Formed integral with and depending from the central portion of the bottom plate 22 is a substantially hollow structure 24 in which is formed a plurality of pockets 25. These pockets, the rear ends of which are open, are for the accommodation of a drawbar and safety bar, the same being secured to the cradle by means of a vertically disposed pin or the like that passes through vertically alined openings 26 that are formed in plate 22 and in the plates of structure 24 above and below said openings.

A locomotive cradle or rear frame of my improved construction is very strong and rigid, and can be produced with much less time, labor and expense than frames which are assembled or built up from a number of structural shapes and castings. Further, a one-piece structure eliminates joints and consequently does away with structural weaknesses which invariably develop where an assembled or fabricated structure is subjected to continued service strains and vibrations. It will be noted that in my improved cradle the main parts thereof, namely, the side members, the front end frame brace structure, and the rear end deck plate structure, lie outside of and consequently substantially inclose the trailer truck that is associated with said cradle.

It will be readily understood that minor changes in the size, form and construction of the various parts of my improved locomotive cradle can be made and substituted for those herein shown and described, without departing from the spirit of my invention, the scope of which is set forth in the appended claims.

I claim:

1. A cast-metal locomotive cradle having connected side members that are spaced a sufficient distance apart to accommodate between them the wheels of the trailer truck that is associated with said cradle.

2. A cast-metal locomotive cradle comprising a pair of side members, a frame brace formed integral with and connecting the forward portions of said side members, a deck plate formed integral with and connecting the rear portions of said side members, and said side members being spaced a sufficient distance apart to accommodate between them the wheels of the trailer truck that is associated with the cradle.

3. A cast-metal locomotive cradle comprising integrally connected side members, the central portions of which are provided with vertically disposed openings for the accommodation of parts of the equalizing system associated with the locomotive frame.

4. A cast-metal locomotive cradle comprising integrally connected side members, the central portions of which are provided with vertically disposed openings for the accommodation of parts of the equalizing system associated with the locomotive frame, and the end portions of said side members being substantially box-shape in cross section.

5. A cast-metal locomotive cradle comprising integrally connected side members, the central portions of which are provided with vertically disposed openings for the accommodation of parts of the equalizing system associated with the locomotive frame, and pedestals formed integral with and depending from the central portions of said side members.

6. A cast-metal locomotive cradle comprising side members, portions of which are spaced a sufficient distance apart to accommodate between them the wheels of the trailer truck associated with the cradle, a frame brace formed integral with and connecting the forward portions of said side members, portions of which frame brace constitute seats and points of attachment for parts of the main frame of the locomotive, and a deck plate structure formed integral with and connecting the rear portions of said side members.

7. A cast-metal locomotive cradle comprising side members, portions of which are spaced a sufficient distance apart to accommodate between them the wheels of the trailer truck associated with the cradle, a frame brace formed integral with and connecting the forward portions of said side members, portions of which frame brace constitute seats and points of attachment for parts of the main frame of the locomotive, and a deck plate structure formed integral with and connecting the rear portions of said side members, which deck plate structure includes an integrally formed chafing plate.

8. A cast-metal locomotive cradle comprising side members, portions of which are spaced a sufficient distance apart to accommodate between them the wheels of the trailer truck associated with the cradle, a frame brace formed integral with and connecting the forward portions of said side members, portions of which frame brace constitute seats and points of attachment for parts of the main frame of the locomotive, and a deck plate structure formed integral with and connecting the rear portions of said side members, said deck plate structure being provided with pockets adapted to receive a draw-bar and a safety bar.

9. A cast-metal locomotive cradle formed in a single piece and comprising a deck plate, a frame brace, and side members, said parts being spaced apart a sufficient distance to accommodate between them the wheels of the trailer truck associated with the cradle.

10. A cast-metal locomotive cradle formed in a single piece and comprising side members, a frame brace, and a deck plate, the central portions of said side members being spaced a sufficient distance apart so as to occupy positions outside the wheels of the trailer truck associated with said cradle.

In testimony whereof I hereunto affix my signature this 9th day of April, 1920.

WILLIAM M. SHEEHAN.